United States Patent
Sawada et al.

(10) Patent No.: US 9,163,969 B2
(45) Date of Patent: Oct. 20, 2015

(54) FLOW RATE MEASUREMENT DEVICE AND FLOW RATE MEASUREMENT METHOD FOR FLOW RATE CONTROLLER FOR GAS SUPPLY DEVICE

(71) Applicant: FUJIKIN INCORPORATED, Osaka (JP)

(72) Inventors: Yohei Sawada, Osaka (JP); Masaaki Nagase, Osaka (JP); Nobukazu Ikeda, Osaka (JP); Kouji Nishino, Osaka (JP); Ryousuke Dohi, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 168 days.

(21) Appl. No.: 13/936,324

(22) Filed: Jul. 8, 2013

(65) Prior Publication Data

US 2014/0013838 A1    Jan. 16, 2014

Related U.S. Application Data (63) Continuation-in-part of application No. PCT/JP2011/006605, filed on Nov. 28, 2011.

(30) Foreign Application Priority Data

Jan. 6, 2011 (JP) ................................. 2011-000904

(51) Int. Cl.
*G01F 5/00* (2006.01)
*G01F 1/34* (2006.01)
(Continued)

(52) U.S. Cl.
CPC .. *G01F 5/00* (2013.01); *G01F 1/34* (2013.01); *G01F 1/86* (2013.01); *G01F 15/046* (2013.01)

(58) Field of Classification Search
CPC ................ G01F 5/00; G01F 5/05; A01J 5/01
USPC .................. 73/203, 202, 254, 152.29, 861
See application file for complete search history.

(56) References Cited

U.S. PATENT DOCUMENTS

2006/0278276 A1*  12/2006  Tanaka et al. ............... 137/487.5
2009/0019943 A1*   1/2009  Ozawa et al. ................... 73/861
(Continued)

FOREIGN PATENT DOCUMENTS

| JP | 2006-337346 A | 12/2006 |
| JP | 2010-210528 A | 9/2010 |
| WO | 2007/102319 A1 | 9/2007 |

OTHER PUBLICATIONS

CKD Corp JP Publication 2006-337346.*
(Continued)

*Primary Examiner* — Lisa Caputo
*Assistant Examiner* — Nigel Plumb
(74) *Attorney, Agent, or Firm* — Griffin & Szipl, P.C.

(57) ABSTRACT

A flow rate measurement device includes a branched pipe passage having an inlet side end portion detachably joined in a branched manner to an upstream portion of on-off valve $V_O$ provided on an outlet end portion of a gas supply line, and an outlet side end portion of the branched pipe passage joined to a gas flow-out side, an on-off valve V provided on the outlet side of the branched pipe passage, a pressure detector and a temperature detector that detect gas pressure and temperature on the upstream side of the on-off valve V, and an arithmetic operation control device receiving detection signals as input from the pressure detector and the temperature detector, and which arithmetically calculates gas flow rate of gas flowing in the branched pipe passage, and the flow rate measurement device is detachably joined in a branched manner to the upstream portion of the on-off valve $V_O$.

2 Claims, 3 Drawing Sheets

(51) Int. Cl.
*G01F 1/86* (2006.01)
*G01F 15/04* (2006.01)

(56) References Cited

U.S. PATENT DOCUMENTS

2010/0095761 A1* 4/2010 Ariyoshi et al. ............. 73/202.5
2010/0229967 A1* 9/2010 Yasuda et al. ................ 137/486
2010/0236646 A1* 9/2010 Anzai et al. ................... 137/551
2010/0251814 A1* 10/2010 Baker et al. ..................... 73/203

OTHER PUBLICATIONS machine translation of JP2006-337346, downloaded Jun. 13, 2013.
Search Report issued in International application PCT/JP2011/006605, completed Dec. 13, 2011 and mailed Dec. 27, 2011.

* cited by examiner

Prior Art

Fig. 6

Prior Art

FLOW RATE MEASUREMENT DEVICE AND FLOW RATE MEASUREMENT METHOD FOR FLOW RATE CONTROLLER FOR GAS SUPPLY DEVICE

This is a Continuation-in-Part (CIP) Application in the United States of International Patent Application No. PCT/JP2011/006605 filed Nov. 28, 2011, which claims priority on Japanese Patent Application No. 2011-000904, filed Jan. 6, 2011. The entire disclosures of the above patent applications are hereby incorporated by reference.

TECHNICAL FIELD OF THE INVENTION

The present invention relates to an improvement in a flow rate measurement device and a flow rate measurement method for a flow rate controller of a gas supply device to be used in a semiconductor manufacturing apparatus and a drug production apparatus, etc., and, to a flow rate measurement device and to a flow rate measurement method for a flow rate controller for a gas supply device, which enables downsizing, structural simplification, higher measurement accuracy, and quicker flow rate measurement of the gas supply device.

BACKGROUND OF THE INVENTION (ART)

A gas supply device of a semiconductor manufacturing apparatus, etc., is generally configured to switch and supply a large variety of gases to an object to use the gas, such as a process chamber, so that a necessary process gas, whose flow rate is controlled by a flow rate controller provided for each kind of supply gas, is supplied to the object to use the gas. The flow rate measurement of each flow rate controller described above is performed at appropriate time intervals generally by a build-up method (or rate of pressure rise (ROR) method), and flow rate measurement is performed by comparing a set flow rate of the flow rate controller with an actual control flow rate measured by the build-up method, etc.

Figure 5:
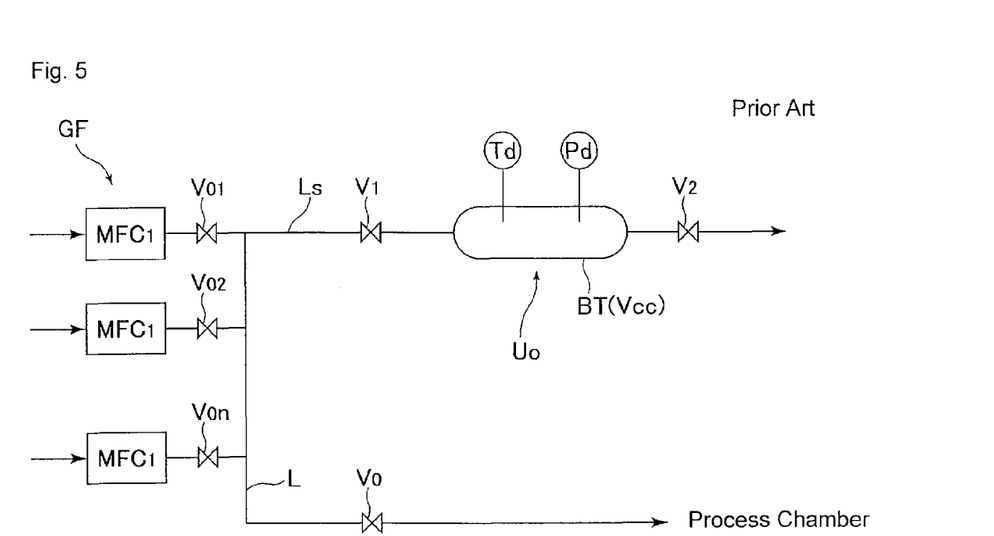
FIG. 5 illustrates a schematic view of a flow rate measurement apparatus and method based on a conventional build-up method.
Figure 6:
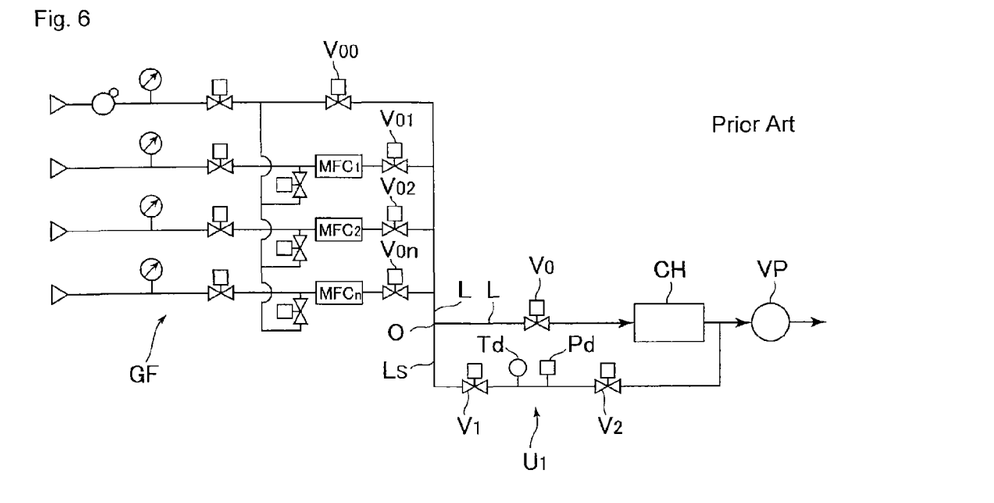
FIG. 6 illustrates a schematic view of a flow rate measurement apparatus and method based on another conventional build-up method.

FIG. 5 and FIG. 6 show examples of conventional flow rate measurement devices and methods of a flow rate controller for a gas supply device. Specifically, in the measurement device and method shown in FIG. 5, first, a flow rate measurement unit $U_0$ including a build-up tank BT with a known inner volume, an inlet on-off valve $V_1$, an outlet on-off valve $V_2$, a pressure detector Pd, and a gas temperature detector Td, is joined to a gas supply line L in a branched form. Next, for example, to measure a flow rate controller $MFC_1$ of a gas supply device GF, first, on-off valves $V_{02}$, $V_{0n}$, and $V_0$ are closed and on-off valves $V_{01}$, $V_1$, and $V_2$ are opened, so as to flow the gas into the tank BT, and a pressure detected value $P_1$ and a temperature detected value $T_1$ at a time $t_1$, in a state where the on-off valves $V_1$ and $V_2$ are opened, or at a time $t_1$ in a state where the on-off valve $V_2$ is closed after the on-off valves $V_1$ and $V_2$ are opened, are measured. Next, a pressure detected value $P_2$ and a temperature detected value $T_2$ are measured $\Delta t$ seconds after the on-off valve $V_1$ is closed from the opened state of the on-off valves $V_1$ and $V_2$ or $\Delta t$ seconds after the time $t_1$ in a state where the on-off valve $V_2$ is closed after the on-off valves $V_1$ and $V_2$ are opened.

Then, from the respective measured values described above, a rate of pressure rise $\Delta P/\Delta t$ is obtained, a flow rate Q is calculated based on $Q=(\Delta P/\Delta t)\times(V/RT)$, and a flow control value of the flow rate controller $MFC_1$ is confirmed. The flow rate calculation formula is for arithmetically calculating a build-up flow rate into the tank BT on the assumption that the gas is an ideal gas, and V is a total inner volume of the build-up tank VT and the pipe passage on the upstream side, R is a gas constant, and T is a gas temperature inside the tank BT.

On the other hand, in the measurement method shown in FIG. 6, a flow rate measurement unit $U_1$ without the build-up tank is joined to a gas supply line L in a branched form. Then, for example, to measure the flow rate controller $MFC_1$ of the gas supply device GF, first, on-off valves $V_0$, $V_{00}$, $V_{02}$, and $V_{0n}$ are closed and on-off valves $V_{01}$, $V_1$, and $V_2$ are opened to supply the gas at a set flow rate from the flow rate controller $MFC_1$ to the flow rate measurement unit $U_1$, and then, the on-off valve $V_2$ is closed. After the on-off valve $V_2$ is closed, when the pressure detected value of the pressure detector Pd reaches pressure $P_1$, a first measurement is performed to measure the pressure $P_1$ and the temperature $T_1$. Thereafter, when the pressure detected value of the pressure detector Pd reaches $P_2$ (or when a set time of t seconds elapses), a second measurement is performed to measure the pressure $P_2$ and the temperature $T_2$.

In addition, by arithmetically calculating a sum V of a pipe passage inner volume Ve of the portion of the gas supply lines L and Ls from the on-off valve $V_{00}$, the on-off valve $V_{01}$, the on-off valve $V_{02}$, and the on-off valve $V_{0n}$ on the upstream side of the flow rate measurement unit $U_1$ to the on-off valve $V_1$ and an inner volume Vt of the flow passage between the on-off valve $V_1$ and the on-off valve $V_2$ of the flow rate measurement unit $U_1$ based on the flow rate formula $Q=(\Delta P/\Delta t)\times(V/RT)$ by using a rate of pressure rise $\Delta P/\Delta t$ obtained by the same measurement method as in the case of FIG. 5, and the flow rate value Q of the flow rate controller $MFC_1$ at that time, the total inner volume V is obtained in advance.

Then, from the respective measured values described above, a gas absolute flow rate Qo at a temperature of 0° C. at 1 atm from the flow rate controller $MFC_1$ is obtained based on the relationship between the inflow mass dG and an elapsed (inflow) time dt of the gas. That is, the inflow mass dG can be expressed by $dG=ro\cdot Qo\cdot dt$ (provided that dt is an elapsed (inflow) time and ro is a specific weight of the gas). Based on the pressures P and temperatures T measured by the first measurement and the second measurement described above, an ideal gas has a relationship of PV=nRT, and by substituting the mass G for the mole number n, the relationship of PV=GRT is established.

Therefore, on the assumption that the gas pressure $P_1$, gas temperature $T_1$, gas mass $G_1$ are measured by the first measurement, and the gas pressure $P_2$, gas temperature $T_2$, and gas mass $G_2$ are measured by the second measurement, the difference in mass G (inflow mass dG) is expressed by $dG=G_2-G_1=P_1/T_1\cdot V/R-P_2/T_2\cdot V/R=(P_1/T_1-P_2/T_2)\cdot V/R$ ... Formula (I), and from the above-described formula $dG=ro\cdot Qo\cdot dt$, the absolute flow rate Qo of the gas can be calculated by $Qo=(P_1/T_1-P_2/T_2)\cdot V/R\cdot 1/(ro\cdot t)$. Based on the calculated value Qo, it is determined whether the flow rate control performance of the flow rate controller $MFC_1$ is proper.

In the method shown in FIG. 6, the objects of the invention are (1) to reduce errors of the calculated reference flow rate by using a coefficient that is a compression factor in Formula (1) described above since application of the ideal gas equation becomes difficult depending on the kind of gas, and (2) to determine the timing to start the second measurement after the first measurement based on a pressure rise value when the control flow rate is in the range of 1000 to 2000 Standard Cubic Centimeters per Minute (SCCM) or based on an elapsed time when the control flow rate is in the range of 2 to 1000 SCCM.

In the method shown in FIG. 6, it is also a matter of course that a rate of pressure rise $\Delta P/\Delta t$ is obtained from the respective measured values described above, a flow rate Q is calculated based on $Q=(\Delta P/\Delta t)\times(V/RT)$, and it can be determined whether the flow rate control value of the flow rate controller $MFC_1$ is proper based on the calculated value.

The method using the build-up tank BT shown in FIG. 5 has problems including that (1) the flow rate measurement device increases in size (must be made larger) due to the use of the build-up tank BT and it is not possible to downsize the dimensions of the gas supply device, (2) the measured value of the gas temperature inside the tank BT significantly fluctuates according to the position of attachment of the temperature detector Td, (3) the gas temperature T during rise of the gas pressure inside the tank significantly fluctuates and does not become a constant temperature T, and (4) when a temperature change of the outside air is large, the gas temperature during pressure detection changes and fluctuation of the temperature detected value T increases, etc., so that even if the gas is close to an ideal gas, high flow rate measurement accuracy cannot be obtained.

On the other hand, in the method shown in FIG. 6, the valve $V_1$ is provided on the flow-in side of the flow rate measurement unit $U_1$, and via this valve, the unit $U_1$ is joined to the end portion of the branched connection pipe passage Ls. However, this valve $V_1$ is not used for flow rate measurement at all, rather, the presence of this valve $V_1$ poses various problems, namely, that fluid resistance increases, a drive mechanism of the valve $V_1$, for example, an electromagnetic valve and drive fluid piping, etc., become necessary, the component cost and assembly cost increase, an operation delay is caused by the driving performance of the valve $V_1$, and timing adjustment becomes necessary, etc.

In the method shown in FIG. 6, in order to measure a sum volume V of the flow passage inner volume Ve of the fluid supply line L and the branched connection pipe passage Ls and the flow passage inner volume Vt of the flow rate measurement unit $U_1$, the valve $V_1$ is opened and closed twice, and during this time, the inside of the flow rate measurement unit $U_1$ is vacuumed. These valve openings and closings require too many procedures to perform flow rate measurement.

PRIOR ART DOCUMENTS

Patent Documents

Patent Document 1: Japanese Published Unexamined Patent Application No. 2006-337346; and Patent Document 2: International Publication No. WO 2007/102319.

Problems to be Solved by the Invention

A main object of the present invention is to provide a flow rate measurement device for a flow rate controller for a gas supply device that is small in size, can be easily attached to the gas supply device, and realizes highly accurate flow rate measurement by easy operation. This main object of the present invention also includes providing a flow rate measurement method using the flow rate measurement device by solving the above-described problems in flow rate measurement of a flow rate controller using a conventional flow rate measurement unit $U_1$, that is, the valves $V_1$ and $V_2$ are provided on each of the fluid inlet side and the fluid outlet side of the flow rate measurement unit $U_1$. Due to provision of the inlet side valve $V_1$, the fluid resistance increases, the inlet side valve $V_1$ requires a drive mechanism including an electromagnetic valve and drive fluid piping, etc., so the assembly cost for this increases, and the drive mechanism causes operation delay due to its driving performance and requires timing adjustment, etc. Thus, the present invention solves the problem that calculation of a total inner volume V, which includes an inner volume Ve of the fluid supply line L and the branched connection pipe passage Ls and an inner volume Vt of the flow rate measurement unit $U_1$, takes too many operations (i.e., steps).

SUMMARY OF THE INVENTION

Means for Solving the Problem

According to a first non-limiting illustrative embodiment of the present application, the invention is basically constructed so that a flow rate measurement device includes a branched pipe passage Lb having an inlet side end portion that is detachably joined in a branched manner to an upstream portion of an on-off valve $V_0$ provided on the outlet end portion of a gas supply line L, and an outlet side end portion of the branched pipe passage Lb is joined to a gas flow-out side. The flow rate measurement device further includes an on-off valve V provided on the outlet side of the branched pipe passage Lb, a pressure detector Pd and a temperature detector Td, which respectively detect a gas pressure and a gas temperature of a gas flowing in the on-off valve V, and an arithmetic operation control device CP into which detection signals from the pressure detector Pd and the temperature detector Td are input, and which arithmetically calculates a flow rate of a gas flowing in the branched pipe passage Lb, and the flow rate measurement device is detachably joined in a branched arrangement to an upstream portion of the on-off valve $V_0$ provided on the outlet end portion of the gas supply line L of the gas supply device GF.

According to a second non-limiting embodiment of the present application, the invention is basically constructed so that, in a gas supply device that supplies a plurality of kinds of gases to a gas use portion in a switchable manner through each of the flow rate controllers, respectively, a flow rate measurement device U includes a branched pipe passage Lb, an on-off valve V provided on the outlet side of the branched pipe passage Lb, a gas pressure detector Pd and a gas temperature detector Td in the branched pipe passage Lb, and an arithmetic operation control device CP that is joined in a branched arrangement to a gas supply line L of the gas supply device, wherein the on-off valve V of the flow rate measurement device U is connected to a gas flow-out side, and first, the outlet side on-off valves $V_{O1}$ to $V_{On}$ of each flow rate controller of the flow rate control device, and an on-off valve $V_O$ on the outlet end portion of the gas supply line L, are closed and the on-off valve V of the flow rate measurement device U is opened, and then, only the outlet side on-off valve of the flow rate controller to be measured is opened to flow the gas into the flow rate measurement device U at a set flow rate, and the on-off valve V is closed after the gas pressure and the gas temperature become stable. A first measurement of a gas temperature $T_1$ and a gas pressure $P_1$ is performed at a time $t_1$ at which the gas pressure reaches a set pressure $P_1$, a second measurement of a gas temperature $T_2$ and a gas pressure $P_2$ is performed at a time $t_2$ at which the gas pressure reaches a set pressure $P_2$, and from the respective measured values described above, a gas flow rate Q is arithmetically calculated based on the relationship wherein $Q=(22.4V/R\cdot\Delta t)\times(P_2/T_2-P_1/T_1)$, provided that V is the total inner volume of the branched pipe passage Lb and the gas supply line L, R is a gas constant, $\Delta t$ is $t_2-t_1$.

According to a third non-limiting illustrative embodiment of the present application, the invention is basically constructed so that, in a gas supply device that supplies a plurality of kinds of gases to a gas use portion in a switchable manner through each of the flow rate controllers, respectively, a flow rate measurement device U includes a branched pipe passage Lb, an on-off valve V provided on the outlet side of the branched pipe passage Lb, a gas pressure detector Pd and a gas temperature detector Td in the branched pipe passage Lb, and an arithmetic operation control device CP, which is joined in a branched structure to a gas supply line L of the gas supply device, and the on-off valve V of the flow rate measurement device U is connected to a gas flow-out side, and first, outlet side on-off valves $V_{01}$ to $V_{0n}$ of each flow rate controller of the flow rate control device and an on-off valve $V_0$ on the outlet end portion of the gas supply line L are closed and the on-off valve V of the flow rate measurement device U is opened, and then, only the outlet side on-off valve of the flow rate controller to be measured is opened to flow the gas into the flow rate measurement device U at a set flow rate, and the on-off valve V is closed after the gas pressure and the gas temperature become stable, so a rate of gas pressure rise $\Delta P/\Delta t$ is measured, and a flow rate Q is arithmetically calculated based on $Q=\Delta P/\Delta t \times V/R \cdot T$ (provided that V is the total inner volume of the branched pipe passage Lb and the gas supply line L, R is a gas constant, $\Delta t$ is a measurement time, and T is a gas temperature).

According to fourth non-limiting illustrative embodiment of the invention, the second or third non-limiting embodiments are modified so that the flow rate measurement device U includes a branched pipe passage Lb having an inlet side end portion joined to a gas supply line L and an outlet side end portion joined to a gas flow-out side, respectively, and provided with the on-off valve V on the outlet side of the branched pipe passage Lb, the pressure detector Pd and the temperature detector Td, which respectively detect a gas pressure and a gas temperature of a gas flowing in the on-off valve V, and an arithmetic operation control device CP into which detection signals from the pressure detector Pd and the temperature detector Td are input. The arithmetic operation control device CP arithmetically calculates a gas flow rate of the gas flowing in the branched pipe passage Lb, and the flow rate measurement device U further includes an electromagnetic valve EV that supplies a drive fluid to the on-off valve V, a drive fluid source DGS that supplies a drive fluid to the electromagnetic valve EV, an I/O board IO for the arithmetic operation control device CP, and a power source device ES.

Effects of the Invention

In accordance with the present invention, the above described volume V can be easily obtained based on $V=\Delta t \times Q \times R \times T/\Delta P$ (provided that Q is a flow rate, P is a fluid pressure, T is a temperature, R is a gas constant, $\Delta P/\Delta t$ is a rate of pressure rise) by measuring a rate of pressure rise at the gas flow rate Q by using a nitrogen gas, etc. That is, even if the on-off valve $V_1$ is not provided, the total inner volume V of the branched pipe passage Lb and the gas supply line L necessary for flow rate measurement can be easily calculated, so that the flow rate measurement operation of the flow rate controller becomes easier.

In accordance with the present invention, the on-off valve V that is provided in the branched pipe passage Lb of the flow rate measurement device U is provided only on the outlet side end of the branched pipe passage Lb, so that not only can the flow rate measurement device U be downsized and structurally simplified, but also the gas flow passage resistance can be reduced. During operation of the gas supply device GF, the gas pressure in the gas supply line L on the secondary side can always be monitored by the pressure detector Pd, and it can be immediately confirmed in advance whether the pressure state allows flow rate measurement.

At the time of the flow rate measurement operation, not only can an alarm be immediately issued in response to a measurement start signal when the pressure state is abnormal, but also the pressure state in the gas supply line L on the secondary side can always be monitored, so that the pressure detector Pd can be utilized as a gas pressure monitor of the gas supply line L. Furthermore, when the flow rate controller is a pressure type flow rate control device, a detection signal of the pressure detector Pd can also be utilized as an alarm showing a lower limit value of the flow rate control range of the flow rate controller.

DETAILED DESCRIPTION OF THE INVENTION

Best Mode for Carrying Out the Invention

Figure 1:
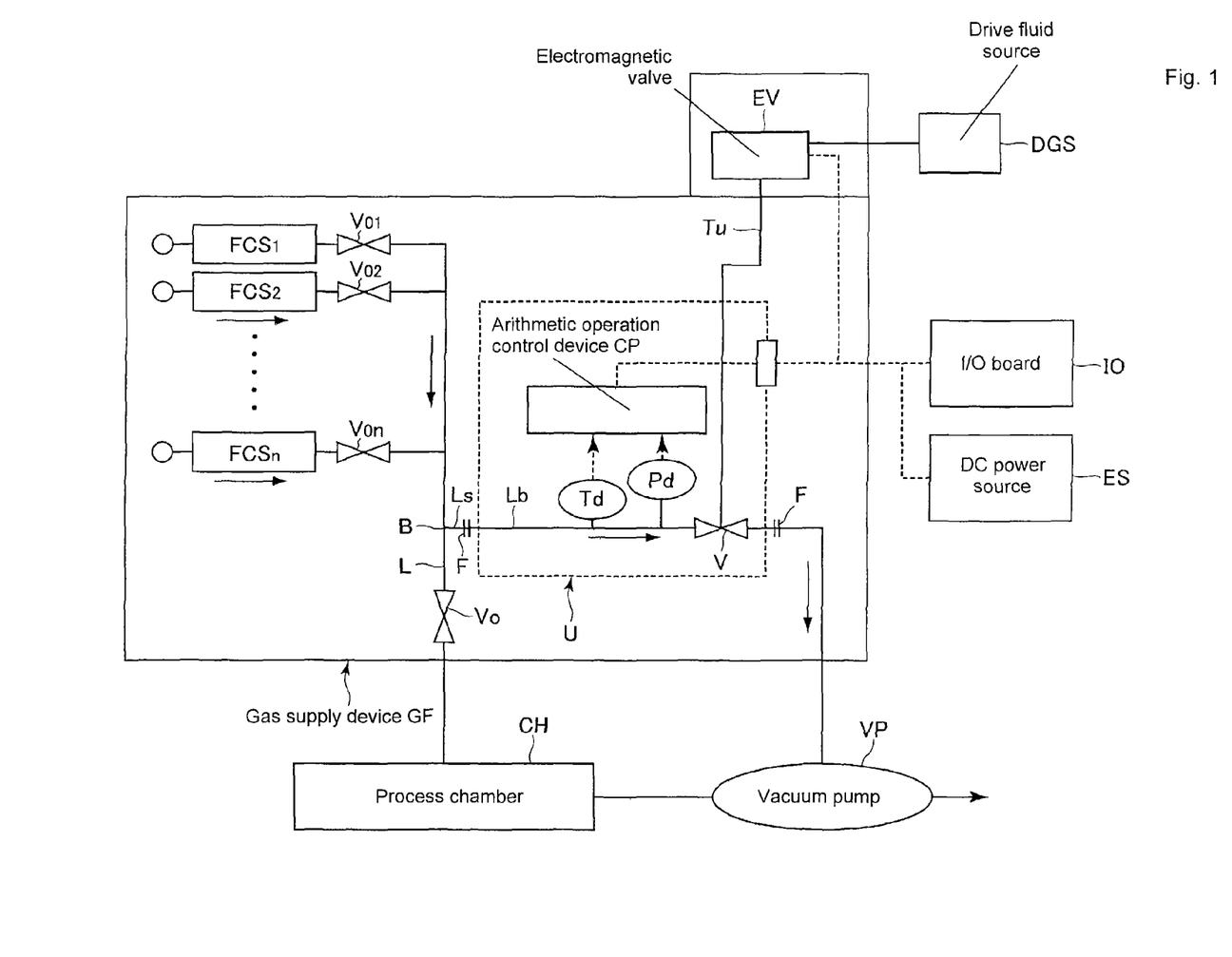
FIG. 1 is a schematic configuration diagram of a flow rate measurement device of a flow rate controller for a gas supply device according to the present invention.
Figure 2:
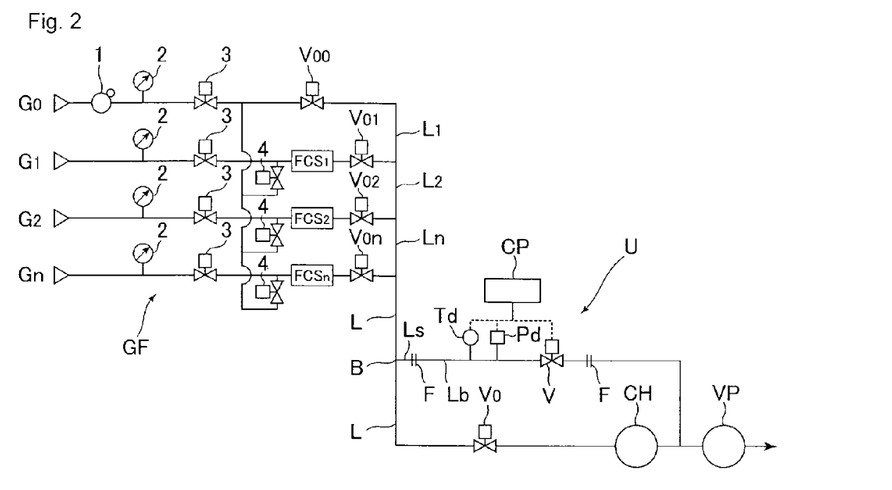
FIG. 2 illustrates a schematic view of a gas supply device including a flow rate measurement device.

FIG. 1 is an illustrated schematic view showing a configuration of a flow rate measurement device of a flow rate controller for a gas supply device according to the present invention, and FIG. 2 is an illustrated schematic view showing an embodiment of a measurement method for a flow rate controller in the case where flow rate measurement of a pressure type flow rate controller FCS provided in the gas supply device GF is performed.

In FIG. 1 and FIG. 2, GF denotes a gas supply device, $FCS_1$ to $FCS_n$ denote flow rate controllers, $G_0$ to $G_n$ denote kinds of supply gases, $L_1$ to $L_n$ and L denote gas supply lines, Ls denotes a branched connection pipe passage, Lb denotes a branched pipe passage, $V_{00}$ to $V_{0n}$ denote on-off valves, $V_0$ denotes an on-off valve, V denotes an on-off valve, CH denotes a process chamber, VP denotes a vacuum pump, Td denotes a temperature detector, Pd denotes a pressure detector, B denotes a branch point, F denotes a connecting flange, EV denotes an electromagnetic valve, DGS denotes a drive fluid source, Tu denotes a drive fluid supply pipe, IO denotes an I/O board, ES denotes a DC power source, 1 denotes a pressure regulator, 2 denotes a pressure gauge, 3 and 4 denote on-off valves, U denotes a flow rate measurement device, and CP denotes an arithmetic operation control device. A predetermined kind of gas is switched and supplied from the gas supply device GF to the process chamber CH through the gas supply line L and the on-off valve $V_0$.

The flow rate measurement device U is detachably joined in a branched structure to an upstream portion of the on-off valve $V_O$ provided on the outlet end portion of the gas supply line L. The flow rate measurement device U includes a straight branched pipe passage Lb with an appropriate inner diameter having an inlet side end portion that is joined to the gas supply line L and an outlet side end portion that is joined to the gas flow-out side, a fluid pressure-driven metal diaphragm type on-off valve V provided on the outlet side of the branched pipe passage Lb, a pressure detector Pd and a temperature detector Td that detect a gas pressure and a gas temperature on the upstream side of the on-off valve V, respectively, an arithmetic operation control device CP into which detection signals from the pressure detector Pd and the temperature detector Td are input and which arithmetically operates to calculate a gas flow rate of a gas flowing in the branched pipe passage Lb, an electromagnetic valve EV that supplies a drive fluid to the on-off valve V, a drive fluid source DGS that supplies a drive fluid to the electromagnetic valve EV, an I/O board IO for the arithmetic operation control device CP, and a power source device ES.

Respective detected outputs of the pressure detector Pd and the temperature detector Td of the flow rate measurement device U, and a control signal of the on-off valve V, etc., are output and input into the arithmetic operation control device CP and, as described later, display and arithmetic calculation, etc., of a gas flow rate value are performed.

Figure 3:
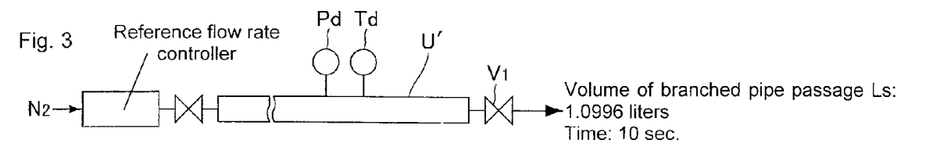
FIG. 3 illustrates a schematic view of an apparatus and a method for measuring a pipe passage inner volume.

First, the inventor of the present invention made the flow rate measurement unit U' shown in FIG. 3, and by using this device, raised the gas pressure by means of a build-up method, and investigated changes in gas temperature and gas pressure inside the unit U' (inner volume: 1.0996 liters). That is, in the embodiment shown in FIG. 1, a reference flow rate controller was attached instead of the flow rate controller FCS, and the flow rate measurement unit U' shown in FIG. 3 was connected instead of the flow rate measurement device U, and then, the on-off valves $V_{O2}$, $V_{On}$, and $V_O$, were closed and the on-off valve V was opened to flow an $N_2$ gas at a flow rate of 500 SCCM for a predetermined time. After it was confirmed that the flow rate, pressure, and temperature of the $N_2$ gas had become stable, then the on-off valve V was closed and build-up was performed for 10 seconds and, during this time, changes in gas temperature and pressure, etc., inside the unit U' were observed. As the reference flow rate controller, the pressure type flow rate controller with a flow rate range of 1 Standard Liters per Minute (SLM) manufactured by Fujikin Incorporated was used, and the inner volume V of the unit U' was set to 1.0996 liters (known). The gas flow rate ($N_2$) was set to 500 SCCM, and the build-up time was set to 10 seconds. Furthermore, the outside air temperature (indoor temperature) was 21.7° C.

Figure 4:
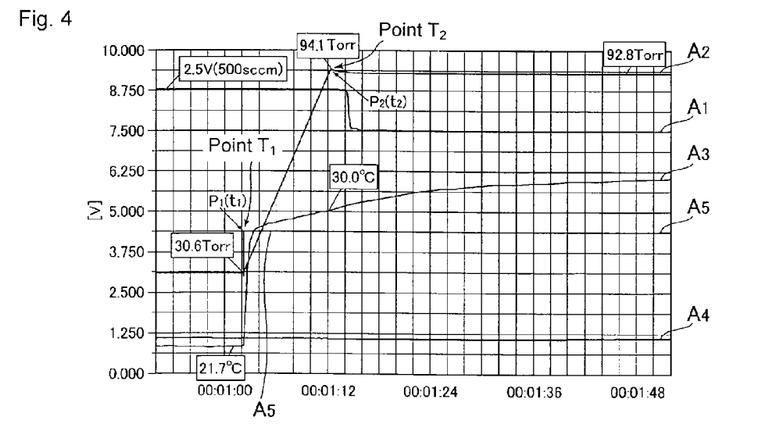
FIG. 4 is a graphic diagram showing change situations of gas pressure and gas temperature in the measurement method according to FIG. 3.

FIG. 4 includes a graph showing changes in gas temperature and gas pressure, etc., inside the flow rate measurement unit U' in the build-up method described above. In FIG. 4, the curve $A_1$ indicates the flow rate output of the flow rate controller, the curve $A_2$ indicates the gas pressure detected value detected by the pressure detector Pd, the curve $A_3$ indicates the gas temperature detected value detected by the temperature detector Td, the curve $A_4$ indicates the outside air temperature (indoor temperature), and the curve $A_5$ indicates the control signal for the output side on-off valve V. As the pressure detector Pd, a (Baratron) capacitance manometer TYPE 627D (1000 Torr Full Scale (F.S.)) pressure detector made by MKS Instruments was used. As the temperature detector Td, a thermocouple (wire type) with a diameter of 2.5 mm was used, and as a measuring instrument, a data logger NR-500 made by KEYENCE CORPORATION was used.

Specifically, as evident in FIG. 4, when the outlet side on-off valve V is closed and build-up is started at the point $t_1$, the gas pressure inside the tank increases from 30.6 Torr to 94.1 Torr at the point $t_2$. The gas temperature inside the tank rises gradually. By arithmetically calculating a gas inflow mass by performing measurement when the outlet side on-off valve V of the flow rate measurement unit U' is closed (when starting build-up) (the time $t_1$, first measurement) and the second measurement at the time $t_2$ after completion of the build-up, when the mole number of the gas that flowed in during build-up is determined by Numerical formula 1 below.

When Numerical formula 1, $$\Delta n = \frac{V}{R}\left(\frac{P_2}{T_2} - \frac{P_1}{T_1}\right),$$

is converted into a gas volume $V_G$ in a standard state (0° C., 1 atm), the following result is Numerical formula 2 shown below.

With Numerical formula 2, $$V_G = \frac{22.4V}{R}\left(\frac{P_2}{T_2} - \frac{P_1}{T_1}\right),$$

thus obtained, the gas flow rate Q into the flow rate measurement unit U' can be calculated as shown below in Numerical formula 3.

Numerical formula 3 provides the following relationship for the gas flow rate:

$$Q = \frac{\Delta V_G}{\Delta t} = \frac{22.4V}{R\Delta t}\left(\frac{P_2}{T_2} - \frac{P_1}{T_1}\right).$$

Here, $\Delta t$ is the build-up time, and $\Delta t = t_2 - t_1$.

As described later, a rate of pressure rise $\Delta P/\Delta t$ is obtained from the respective measured values described above. By using this rate of pressure rise, the total inner volume V is arithmetically calculated based on $V = \Delta t \times Q \times R \times T/\Delta P$, provided that Q is flow rate, T is temperature, R is a gas constant, and $\Delta P/\Delta t$ is a rate of pressure rise.

First Embodiment

Referring to FIG. 1 and FIG. 2, in order to perform flow rate measurement of the flow rate controllers FCS of the gas supply device GF, first, the flow rate controller measurement device U is connected to the gas supply line L in a branched manner. Next, in order to measure the flow rate controller $FCS_1$, the on-off valves $V_{O0}$, $V_{O2}$, $V_{On}$, and $V_O$ are closed and the on-off valves $V_{O1}$ and V are opened to supply a gas flow at a set flow rate Qs from the flow rate controller $FCS_1$ to the flow rate measurement device U, and the gas is exhausted by the vacuum pump VP.

Next, when the gas temperature To and the gas pressure Po inside the branched pipe passage Lb of the flow rate measurement device U become stable, at the time $t_1$, gas build-up is started by closing the outlet side on-off valve V and the gas temperature $T_1$ and the gas pressure $P_1$ inside the branched pipe passage Lb are detected (measured) and input into the arithmetic operation control device CP. When build-up of the gas into the branched pipe passage Lb proceeds and the gas pressure reaches the set value $P_2$ (or the set time $t_2$ is reached), the pressure $P_2$ and the temperature $T_2$ inside the branched pipe passage Lb are detected, and the detected values are input into the arithmetic operation control device CP. After the second detection of the pressure and the temperature at the time $t_2$ is finished, the outlet side on-off valve V is opened to exhaust the gas inside the branched pipe passage Lb.

On the other hand, in the arithmetic operation control device CP, the flow rate Q is arithmetically calculated by using the above-described detected values $P_1$, $T_1$, $P_2$, and $T_2$ based on the Numerical formula 3 described above, and the set flow rate Qs of the flow rate controller $FCS_1$ and the operated flow rate Q are compared, and based on predetermined standards, the judgment of flow rate control performance of the flow rate controller $FCS_1$ and measurement are performed.

By performing the above-described measurement operation for each of the flow rate controllers $FCS_1$ to $FCS_n$, the flow rate controllers of the gas supply device GF are measured.

In the accordance with the present embodiment, the flow rate Q is arithmetically calculated by using the Numerical formula 3, and it is a matter of course that the rate of pressure rise is calculated from the measured values measured by the first measurement and the second measurement described above, so that the flow rate Q is calculated based on $Q=(\Delta P/\Delta t)\times(V/RT)$. Based on the calculated value, it is judged whether the flow rate control value of the flow rate controller FCS is appropriate based on the calculated value.

In accordance with the present invention, it is assumed that the inner volume V in the arithmetic expression of the flow rate Q, that is, the sum of the inner volume of the gas supply line L on the upstream side of the gas supply on-off valve $V_0$ for the process chamber CH and the inner volume of the branched connection pipe Ls and the branched pipe passage Lb is known. However, when the inner volume is changed by alteration, etc., of the gas supply device GF, the changed inner volume must be measured. In this case, for example, a gas close to an ideal gas, such as a nitrogen gas, is used as the gas $G_0$ in FIG. 2, and first, the on-off valves $V_{01}$ to $V_{0n}$ and $V_0$ are closed and the on-off valves $V_{00}$ and V are opened to flow the gas into the branched pipe passage Lb. When the pressure and temperature of the gas reach set values and become stable, the on-off valve V is closed and the pressure detected value $P_1$ and the temperature detected value $T_1$ at the time $t_1$ are measured. Next, at the time $t_2$ after an appropriate time elapses, the pressure detected value $P_2$ and the temperature detected value $T_2$ are measured.

Then, from the respective measured values described above, a rate of pressure rise $\Delta P/\Delta t$ is obtained, and by using this rate of pressure rise, the total inner volume V is arithmetically calculated based on $V=\Delta t\times Q\times R\times T/\Delta P$ (provided that Q is a flow rate, P is a fluid pressure, T is a temperature, R is a gas constant, and $\Delta P/\Delta t$ is the rate of pressure rise).

In the above-described embodiment, a pressure type flow rate control device is used as the flow rate controller, however, the flow rate controller may be a thermal type flow rate controller instead. Also, the connecting flange may be connected by using a pipe joint, etc., or by using a block-shaped joint member, etc. As the on-off valve V, etc., AOVs (air operated valves) are used, however, when electromagnetic valves are used, it is also possible to omit the drive fluid source DGS, the drive fluid supply pipe Tu, and the electromagnetic valve EV that controls the drive fluid.

INDUSTRIAL APPLICABILITY

The present invention is applicable to measurement tests not only of a gas supply device (gas box) for a semiconductor manufacturing apparatus but also of various flow rate controllers for gas supply devices, and flow rate controllers for gas supply systems, to be used for various purposes.

DESCRIPTION OF REFERENCE SYMBOLS

GF: Gas supply device
$FCS_1$ to $FCS_n$: Flow rate controller
$G_0$ to $G_n$: Supply gas kind
L, $L_1$ to $L_n$: Gas supply line
Ls: Branched connection pipe
Lb: Branched pipe passage
F: Connecting flange
B: Branch point
$V_{00}$ to $V_{0n}$: On-off valve
$V_0$: On-off valve
U: Flow rate measurement device
V: On-off valve
CH: Process chamber
VP: Vacuum device (vacuum pump)
Td: Temperature detector
Pd: Pressure detector
1: Pressure regulator
2: Pressure gauge
3, 4: On-off valve
CP: Arithmetic operation control device
EV: Electromagnetic valve
DGS: Drive fluid source
Tu: Drive fluid supply pipe
IO: I/O port
ES: DC power source

The invention claimed is:

1. A flow rate measurement method for a plurality of flow rate controllers for a gas supply device, wherein the gas supply device supplies a plurality of kinds of gases to a gas use portion in a switchable manner through each of the plurality of the flow rate controllers, respectively, wherein the method comprises the steps of:
    (a) providing a flow rate measurement device U that includes,
        i. a branched pipe passage Lb,
        ii. a first on-off valve V provided on an outlet side of the branched pipe passage Lb,
        iii. a gas pressure detector Pd and a gas temperature detector Td disposed in the branched pipe passage Lb to detect a gas pressure and a gas temperature of gas flowing in the branched pipe passage Lb,
        iv. an arithmetic operation control device CP that is operably connected to receive as input detection signals from the gas pressure detector Pd and the gas temperature detector Td from which the arithmetic operation control device CP arithmetically calculates a gas flow rate Q of a gas flowing in the branched pipe passage Lb,
        v. an electromagnetic valve EV disposed to supply a drive fluid to the first on-off valve V,
        vi. a drive fluid source DGS disposed to supply a drive fluid to the electromagnetic valve EV,
        vii. an I/O board IO operably connected to the arithmetic operation control device CP, and
        viii. a power source device ES operably connected to provide power to the electromagnetic valve, wherein an inlet side end portion of the branched pipe passage Lb of the flow rate measurement device U detachably joined in a branched manner and connected directly without disposing an on-off valve to an upstream portion of a second on-off valve $V_0$ provided on an outlet end portion of a gas supply line L of the gas supply device, and an outlet side end portion of the branched pipe passage Lb detachably joined in a branched manner to a gas flow-out side pipe passage that communicates with a vacuum pump VP;

(b) following step (a), closing outlet side on-off valves $V_{01}$ to $V_{0n}$ of each flow rate controller of the gas supply device and closing the second on-off valve $V_0$ on the outlet end portion of the gas supply line L and opening the first on-off valve V provided on the outlet side of the branched pipe passage Lb of the flow rate measurement device U, and gas in the branched pipe passage Lb and the gas supply line L is exhausted by the vacuum pump VP detached to the outlet side of the branched pipe passage Lb;

(c) following step (b), opening only one of the outlet side on-off valves of the flow rate controllers that supplies gas at a set flow rate so as to flow gas into the branched pipe passage Lb of the flow rate measurement device U at the set flow rate, and after gas pressure and gas temperature of the gas in the branched pipe passage Lb stabilize, closing the first on-off valve V to measure a rate of gas pressure rise $\Delta P/\Delta t$, and, by using this rate of pressure rise $\Delta P/\Delta t$, arithmetically calculating a total inner volume V in the branched pipe passage Lb and the gas supply line L by the arithmetic operation control device CP of the flow rate measurement device U based on $V=\Delta t/\Delta P \times Q \times R \times T$, wherein Q is a set flow rate of gas, R is a gas constant, $\Delta t$ is a measurement time, and T is a gas temperature;

(d) following step (c), opening the first on-off valve V to exhaust gas in the branched pipe passage Lb and the gas supply line L by the vacuum pump VP; and (e) then, opening the outlet side on-off valve of flow rate controller to be measured to flow gas into the branched pipe passage Lb of the flow rate measurement device U at a set flow rate, and after gas pressure and gas temperature of the gas in the branched pipe passage Lb stabilize, closing the first on-off valve V to perform a first measurement of a gas temperature $T_1$ and a first measurement of a gas pressure $P_1$ at a first time $t_1$ at which the gas pressure reaches a set first pressure $P_1$, and then performing a second measurement of a gas temperature $T_2$ and a second measurement of a gas pressure $P_2$ at a second time $t_2$ at which the gas pressure reaches a set pressure $P_2$, and from the respective measured values described above, a gas flow rate Q is arithmetically calculated based on the relationship $Q=(22.4V/R \cdot \Delta t) \times (P_2/T_2-P_1/T_1)$, wherein V is the total inner volume of the branched pipe passage Lb and the gas supply line L, R is a gas constant, and $\Delta t$ is $t_2-t_1$.

2. A flow rate measurement method for a plurality of flow rate controllers for a gas supply device, wherein the gas supply device supplies a plurality of kinds of gases to a gas use portion in a switchable manner through each of the plurality of the flow rate controllers, respectively, wherein the method comprises the steps of:

(a) providing a flow rate measurement device U that includes,
  i. a branched pipe passage Lb,
  ii. a first on-off valve V provided on an outlet side of the branched pipe passage Lb,
  iii. a gas pressure detector Pd and a gas temperature detector Td disposed in the branched pipe passage Lb to detect a gas pressure and a gas temperature of gas flowing in the branched pipe passage Lb,
  iv. an arithmetic operation control device CP that is operably connected to receive as input detection signals from the gas pressure detector Pd and the gas temperature detector Td from which the arithmetic operation control device CP arithmetically calculates a gas flow rate Q of a gas flowing in the branched pipe passage Lb,
  v. an electromagnetic valve EV disposed to supply a drive fluid to the first on-off valve V,
  vi. a drive fluid source DGS disposed to supply a drive fluid to the electromagnetic valve EV,
  vii. an I/O board JO operably connected to the arithmetic operation control device CP, and
  viii. a power source device ES operably connected to provide power to the electromagnetic valve, wherein an inlet side end portion of the branched pipe passage Lb of the flow rate measurement device U detachably joined in a branched manner and connected directly without disposing an on-off valve to an upstream portion of a second on-off valve $V_0$ provided on an outlet end portion of a gas supply line L of the gas supply device, and an outlet side end portion of the branched pipe passage Lb detachably joined in a branched manner to a gas flow-out side pipe passage that communicates with a vacuum pump VP;

(b) following step (a), closing outlet side on-off valves $V_{01}$ to $V_{0n}$ of each flow rate controller of the gas supply device and closing the second on-off valve $V_0$ on the outlet end portion of the gas supply line L and opening the first on-off valve V provided on the outlet side of the branched pipe passage Lb of the flow rate measurement device U, and a gas in the branched pipe passage Lb and the gas supply line L is exhausted by the vacuum pump VP detached to the outlet side of the branched pipe passage Lb;

(c) following step (b), opening only one of outlet side on-off valves of the flow rate controller that supplies gas at a set flow rate so as to flow gas into the branched pipe passage Lb of the flow rate measurement device U at the set flow rate, and after gas pressure and gas temperature of the gas in the branched pipe passage Lb stabilize, closing the first on-off valve V on the outlet side of the branched pipe passage Lb to measure a rate of pressure rise $\Delta P/\Delta t$, and by using this rate of pressure rise $\Delta P/\Delta t$, arithmetically calculating a total inner volume V in the branched pipe passage Lb and the gas supply line L by the arithmetic operation control device CP of the flow rate measurement device U based on $V=\Delta t/\Delta P \times Q \times R \times T$, wherein Q is a set flow rate of gas, R is a gas constant, $\Delta t$ is a measurement time, and T is a gas temperature;

(d) following step (c), opening the first on-off valve V to exhaust gas in the branched pipe passage Lb and the gas supply line L by the vacuum pump VP; and (e) then, opening the outlet side on-off valve of the flow rate controller to be measured to flow gas into the branched pipe passage Lb of the flow rate measurement device U at a set flow rate, and after gas pressure and gas temperature of the gas in the branched pipe passage Lb stabilize, closing the first on-off valve V to measure a rate of gas pressure rise $\Delta P/\Delta t$, and by using this rate of pressure rise $\Delta P/\Delta t$, arithmetically calculating a gas flow rate Q by the arithmetic operation control device CP of the flow rate measurement device U based on the relationship $Q=\Delta P/\Delta t \times V/R \cdot T$, wherein V is a total inner volume of the branched pipe passage Lb and the gas supply line L, R is a gas constant, $\Delta t$ is a measurement time, and T is a gas temperature.

* * * * *